United States Patent
Gu et al.

(10) Patent No.: US 9,201,691 B2
(45) Date of Patent: Dec. 1, 2015

(54) METHOD, APPARATUS AND SYSTEM FOR COORDINATING EXECUTION OF TASKS IN A COMPUTING SYSTEM HAVING A DISTRIBUTED SHARED MEMORY

(71) Applicant: Huawei Technologies Co., Ltd., Shenzhen (CN)

(72) Inventors: Lin Gu, Hong Kong (HK); Zhiqiang Ma, Hong Kong (HK); Yulong Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/471,198

(22) Filed: Aug. 28, 2014

(65) Prior Publication Data

US 2014/0373026 A1 Dec. 18, 2014

Related U.S. Application Data

(63) Continuation of application No. PCT/CN2012/075851, filed on May 22, 2012.

(30) Foreign Application Priority Data

Feb. 28, 2012 (CN) .......................... 2012 1 0047777

(51) Int. Cl.
*G06F 13/00* (2006.01)
*G06F 9/48* (2006.01)
(Continued)

(52) U.S. Cl.
CPC ............ *G06F 9/4881* (2013.01); *G06F 3/0604* (2013.01); *G06F 3/065* (2013.01); *G06F 3/067* (2013.01); *G06F 9/5027* (2013.01); *G06F 9/52* (2013.01); *G06F 2003/0697* (2013.01)

(58) Field of Classification Search
CPC ...... G06F 9/4843; G06F 9/4881; G06F 9/544
USPC ........................... 718/100, 102, 107; 719/312
See application file for complete search history.

(56) References Cited

U.S. PATENT DOCUMENTS 5,771,383 A * 6/1998 Magee ................... G06F 9/544
 718/100
5,940,869 A * 8/1999 Schwartz .............. G06F 12/109
 711/206

(Continued)

FOREIGN PATENT DOCUMENTS

CN 1268688 A 10/2000
CN 1804836 A 7/2006

(Continued)

OTHER PUBLICATIONS

Partial English Translation and Abstract of Chinese Patent Application No. CN101079869A, Oct. 28, 2014, 37 pages.

(Continued)

*Primary Examiner* — Andy Ho
(74) *Attorney, Agent, or Firm* — Conley Rose, P.C.; Grant Rodolph

(57) ABSTRACT

A task coordination apparatus in a computing system having a distributed shared memory (DSM) coordinates the execution of two related tasks, wherein the second task has an execution variable which is modified by the first task. The task coordination apparatus creates a snapshot of a memory space in the distributed shared memory assigned to the first task and a cooperation watching area of the second task. The cooperation watching area contains a memory address pointing to a location where the execution variable of the second task is stored in the memory space assigned to the first task. The first task is allocated to a first computing node for execution, and the memory space assigned to it is updated according to the execution result. After updating the memory space, the second task is allocated to a second computing node for execution using the execution variable updated by the first task.

20 Claims, 3 Drawing Sheets

(51) Int. Cl.
*G06F 9/52* (2006.01)
*G06F 3/06* (2006.01)
*G06F 9/50* (2006.01)

(56) References Cited

U.S. PATENT DOCUMENTS

| | | | |
|---|---|---|---|
| 6,449,614 | B1 | 9/2002 | Marcotte |
| 7,823,161 | B2 * | 10/2010 | Klingman ............... G06F 9/463 719/312 |
| 2003/0041173 | A1 | 2/2003 | Hoyle |
| 2006/0161516 | A1 | 7/2006 | Clarke et al. |
| 2013/0132340 | A1 | 5/2013 | Jing et al. |

FOREIGN PATENT DOCUMENTS

| | | | |
|---|---|---|---|
| CN | 1933454 | A | 3/2007 |
| CN | 101079869 | A | 11/2007 |
| CN | 101207515 | A | 6/2008 |
| CN | 101291342 | A | 10/2008 |
| CN | 101631328 | A | 1/2010 |
| CN | 102081551 | A | 6/2011 |
| CN | 102137125 | A | 7/2011 |
| CN | 102346740 | A | 2/2012 |

OTHER PUBLICATIONS

Partial English Translation and Abstract of Chinese Patent Application No. CN101207515A, Oct. 28, 2014, 25 pages.
Partial English Translation and Abstract of Chinese Patent Application No. CN101291342A, Oct. 28, 2014, 14 pages.
Partial English Translation and Abstract of Chinese Patent Application No. CN102137125A, Sep. 1, 2014, 5 pages.
Foreign Communication From a Counterpart Application, PCT Application No. PCT/CN2012/075851, English Translation of International Search Report dated Dec. 6, 2012, 2 pages.
Foreign Communication From a Counterpart Application, PCT Application No. PCT/CN2012/075851, English Translation of Written Opinion dated Dec. 6, 2012, 6 pages.
Foreign Communication From a Counterpart Application, Chinese Application No. 201210047777.4, Chinese Office Action dated Jun. 26, 2013, 6 pages.

* cited by examiner

METHOD, APPARATUS AND SYSTEM FOR COORDINATING EXECUTION OF TASKS IN A COMPUTING SYSTEM HAVING A DISTRIBUTED SHARED MEMORY

CROSS-REFERENCE TO RELATED APPLICATIONS

This application is a continuation of International Application No. PCT/CN2012/075851, filed on May 22, 2012, which claims priority to Chinese Patent Application No. 201210047777.4, filed on Feb. 28, 2012, both of which are hereby incorporated by reference in their entireties.

TECHNICAL FIELD

The present invention relates to the field of distributed shared memory, and in particular, to a method, apparatus and system for coordinating execution of tasks in a computing system having a distributed shared memory.

BACKGROUND

At present, memory structures of parallel computers are generally classified into a shared memory structure and a distributed memory structure. In the shared memory structure, all processors have a global physical memory that is accessed uniformly, and a programming model of a global shared variable is supported. Its programming is simple, but expansibility is poor due to limitations such as a shared memory bandwidth. In the distributed memory structure, many independent computing nodes having local memories are interconnected through a high speed network, and each computing node has an independent address space. Communication between tasks executed by computing node is implemented through transferring an explicit message between the computing nodes. A task is a basic unit for resource allocation and scheduling execution in a system, and includes data and an operation sequence of the data. Multiple tasks may coordinate with each other and be executed concurrently, thereby jointly implementing a specific function. Expansibility of the distributed memory structure is good; however, its program design is difficult because data allocation and message transfer need to be taken into consideration.

A DSM (Distributed Shared Memory) structure implements logical shared memory through hardware or software in a system with scattered physical memories. In a DSM, especially in a DSM implemented through software, an underlying message transfer mechanism is covered up from a user, and the user is allowed to perform parallel program designing in a shared memory manner. A distributed shared memory system not only has an advantage of being easy to program as a shared memory system, but also maintains extensibility of a distributed memory system, and therefore the distributed shared memory system is an important form of a large-scale parallel computing system. In the DSM system, when a specific function jointly implemented by multiple tasks (for example, multiple processes or threads) exists, and the tasks have a restrictive sequence relationship and are required to follow a certain sequence constraint, execution of the tasks needs to be cooperated. Therefore, how to implement cooperation of tasks is a key problem that needs to be solved in parallel program design.

In the prior art, cooperation means such as a lock, a semaphore, and a monitor are only applicable to a single-machine environment having a common memory area. In a barrier cooperation method based on a message transfer programming mode in the prior art, a barrier point is disposed at a position where tasks should wait for each other in a program of each task participating in barrier cooperation. A certain task pauses when proceeding to the barrier point, and the task may continue running after all the tasks proceed to the barrier point. Explicit message transfer programming requires a programmer to pay attention to data division and communication between tasks, and therefore, a lot of efforts are expended on solving data dependency and on deadlock prevention. As a result, an error is likely to occur.

SUMMARY

In one aspect, an embodiment of the present invention provides a method for coordinating execution of tasks in a computing system having a distributed shared memory, comprising: creating a snapshot of a memory space assigned to a first task, the memory space being a part of the distributed shared memory; creating a cooperation watching area of a second task, wherein the second task has an execution variable that is modified by the first task, and the cooperation watching area contains a memory address pointing to a location where the execution variable of the second task is stored in the memory space assigned to the first task; allocating the first task to a first computing node of the computing system for execution; updating, according to an execution result of the first task, the snapshot of the memory space and data in the memory space; and after updating the memory space of the first task, allocating the second task to a second computing node of the computing system, including providing access to the memory address for the execution variable, for the second computing node to execute the second task using the execution variable.

In another aspect, an embodiment of the present invention provides a task cooperation apparatus for coordinating execution of tasks in a computing system having a distributed shared memory, comprising: a processor configured to: create a snapshot of a memory space assigned to a first task, the memory space being a part of the distributed shared memory; create a cooperation watching area of a second task, wherein the second task has an execution variable that is modified by the first task, and the cooperation watching area contains a memory address pointing to a location where the execution variable of the second task is stored in the memory space assigned to the first task; allocate the first task to a first computing node of the computing system for execution; update, according to an execution result of the first task, the snapshot of the memory space and data in the memory space; and after updating the memory space of the first task, allocate the second task to a second computing node of the computing system, including providing access to the memory address for the execution variable, for the second computing node to execute the second task using the execution variable.

In another aspect, an embodiment of the present invention provides a computing system, comprising a first computing node, a second computing node, a task cooperation apparatus, and a distributed shared memory, wherein the task cooperation apparatus is configured to: create a snapshot of a memory space assigned to a first task, the memory space being a part of the distributed shared memory; create a cooperation watching area of a second task, wherein the second task has an execution variable that is modified by the first task, and the cooperation watching area contains a memory address pointing to a location where the execution variable of the second task is stored in the memory space assigned to the first task; allocate the first task to a first computing node of the computing system for execution; update, according to an execution result of the first task, the snapshot of the memory space and data in the memory space; and after updating the memory space of the first task, allocate the second task to a second computing node of the computing system, including providing access to the memory address for the execution variable, for the second computing node to execute the second task using the execution variable.

After the foregoing technical solutions are adopted, in the method, apparatus and system for coordinating execution of tasks in a computing system having a distributed shared memory provided by the embodiments of the present invention, the memory space snapshot of the first task and the cooperation watching area of the second task are created, where the cooperation watching area of the second task contains the memory address pointing to a location where the execution variable of the second task is stored in the memory space assigned to the first task. In one aspect, the first task is locally executed at a computing node, and a shared memory space is not updated until the first task is completed. In another aspect, if the execution variable of the second task is updated by the first task, the updated execution variable of the second task can be obtained according to the memory address of the execution variable of the second task, and the second task is allocated to the second computing node, so that the second task is executed according to the execution variable of the second task updated by the first task. Memory consistency of the distributed shared memory system, namely, correctness of an operation performed by a program on a memory, is well maintained. Furthermore, frequent message sending and status detection required for cooperating tasks and maintaining memory consistency of the distributed shared memory are reduced greatly, which not only simplifies programming, but also improves the processing performance of the system.

BRIEF DESCRIPTION OF THE DRAWINGS

To make the technical solutions in the embodiments of the present invention clearer, accompanying drawings required for illustrating the embodiments are briefly introduced below. The accompanying drawings in the following description are some embodiments of the present invention.

DETAILED DESCRIPTION OF THE EMBODIMENTS

The technical solutions in the embodiments of the present invention are clearly and completely described below with reference to the accompanying drawings in the embodiments of the present invention. Evidently, the embodiments to be described are part of rather than all of the embodiments of the present invention.

Figure 1:
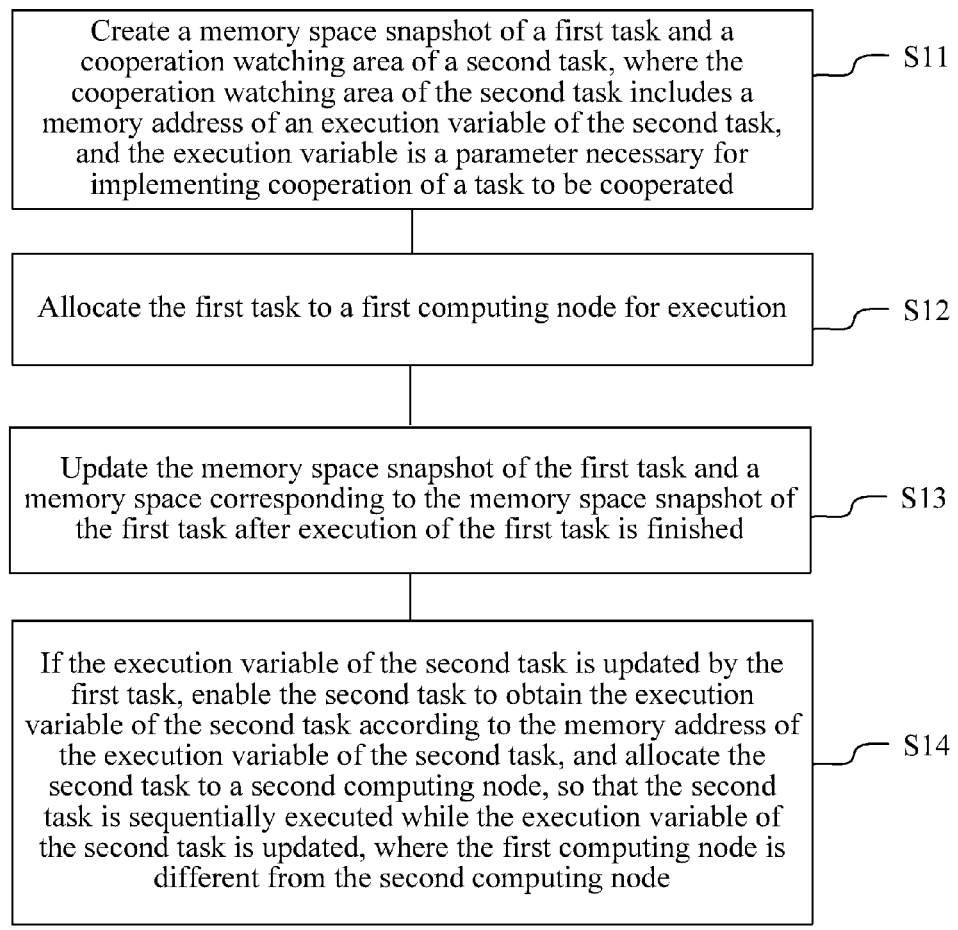
FIG. 1 is a flow chart of a method for coordinating execution of tasks in a computing system having a distributed shared memory according to an embodiment of the present invention.

As shown in FIG. 1, an embodiment of the present invention provides a method for coordinating execution of tasks in a computing system having a distributed shared memory, where the method includes:

S11: Create a memory space snapshot of a first task and a cooperation watching area of a second task, where the cooperation watching area of the second task includes a memory address of an execution variable of the second task, and the execution variable is a parameter necessary for implementing cooperation of a task to be cooperated.

S12: Allocate the first task to a first computing node for execution.

S13: Update the memory space snapshot of the first task and a memory space corresponding to the memory space snapshot of the first task after execution of the first task is finished.

S14: If the execution variable of the second task is updated by the first task, enable the second task to obtain the execution variable of the second task according to the memory address of the execution variable in the cooperation watching area of the second task, and allocate the second task to a second computing node, so that the second task is executed in coordination with the updating of the execution variable of the second task updated by the first task.

After the foregoing technical solution is adopted, in the task cooperation method for a distributed shared memory provided by the embodiment of the present invention, the memory space snapshot of the first task and the cooperation watching area of the second task are created, where the cooperation watching area of the second task stores the memory address of the execution variable of the second task. In one aspect, the first task is locally executed at a computing node, and a shared memory space is not updated until the task is completed. In another aspect, if the execution variable of the second task is updated by the first task, the second task may be enabled to obtain the execution variable of the second task according to the memory address of the execution variable of the second task, and the second task is allocated to the second computing node, so that the second task is executed after the execution variable of the second task is updated by the first task. Memory consistency of a distributed shared memory system, namely, correctness of an operation performed by a program on a memory, is well maintained; meanwhile, frequent message sending and status detection required for cooperating tasks and maintaining memory consistency of the distributed shared memory are reduced greatly, which not only simplifies programming, but also improves processing performance of a system.

It should be noted that, multiple computing nodes exist in a distributed shared memory structure. The first computing node and the second computing node in this embodiment may be the same, and may also be different, which is not limited in the present invention. Different tasks may be allocated to different computing nodes for execution, and may also be allocated to different processors of a same node for execution. In an embodiment of the present invention, when execution of a task on the first computing node is completed and a next task is allocated, an idle computing node needs to be selected to execute the task. In this case, another computing node may be selected, and the first computing node which is idle currently may also be selected.

When execution of one task requires an execution result of another task or multiple other tasks, whether execution of the required other task or multiple other tasks is completed and whether an execution result may be used by a task that needs to be cooperated, namely, a task cooperation problem of the present invention, should be known.

A task in this embodiment may include control information, and data, and a code that are related to the task. The control information may include stack information related to task execution, a cooperation watching area, an address of a first instruction, and so on. Tasks allocated to different computing nodes are executed from the first instruction, and when it is found that data is not at the local during an execution process, the data is obtained from a global shared memory. A global memory may be modified after the tasks are successfully executed, so as to implement updating of the data or cooperation of a subsequent task.

For convenience of description, in this embodiment, it is assumed that the first task may be executed without being restricted by another condition, or in other words, an execution condition of the first task is met. However, execution of the second task relies on an execution result of another task.

It should also be noted that, in the present invention, a task cooperation method for two tasks is taken as an example for description, to which the present invention is not limited. The task cooperation may be cooperation of three or more than three tasks, and a principle is similar to that of the task cooperation method for two tasks.

In step S11, the memory space snapshot of the first task and the cooperation watching area of the second task are created. Optionally, the memory space snapshot of the first task may be a memory space snapshot based on a transactional memory. A memory space related to the first task here is a shared space.

The cooperation watching area of the second task includes the memory address of the execution variable of the second task. The execution variable is the parameter necessary for implementing cooperation of the task to be cooperated. Optionally, the cooperation watching area of the second task may be located in execution context of the second task.

For example, in an embodiment of the present invention, before the second task is executed, the execution context of the second task needs to be initialized. In this case, an area may be added in the execution context of the second task to serve as the cooperation watching area of the second task. In the cooperation watching area of the second task, an address of the execution variable of the second task may be stored. The second task is not executed until the execution variable is obtained through the address.

In step S12, the execution condition of the first task is met, and therefore, the first task is allocated to the first computing node for execution. It should be noted that, in a process of executing the first task, the computing node that executes the first task only performs a write operation on a copy of the memory space snapshot of the first task, and does not update the memory space snapshot and its corresponding memory space. The copy of the memory space snapshot of the first task here is a local memory of the computing node. That is to say, in the process of executing the first task, only the local memory of the computing node is updated, and a shared memory is not updated.

After execution of the first task is finished, in step S13, the memory space snapshot of the first task and the memory space corresponding to the memory space snapshot of the first task are updated after execution of the first task is finished.

After step S13, in the task cooperation method for a distributed shared memory provided by this embodiment, it may be determined, according to an execution variable of each task that needs to be cooperated, whether an execution result of any task, such as an execution result of the first task, is an execution variable of another task. If an execution result of a task is an execution variable of another task, each time execution of the task is completed and a memory space snapshot of the task and its corresponding memory space are updated, the execution result of the task, namely, the execution variable of the other task, is also stored in the updated memory space. Therefore, the execution variable of the other task is also updated, so that the other task is enabled to obtain the updated execution variable according to the address of the execution variable in a cooperation watching area of the other task. If execution of a certain task is not completed, another task cannot be enabled to obtain an execution variable related to the certain task.

In step S14, if the execution variable of the second task is updated by the first task, the second task is enabled to obtain the execution variable of the second task according to the memory address of the execution variable of the second task, and the second task is allocated to the second computing node, so that the second task is executed after the execution variable of the second task is updated by the first task.

For example, in an embodiment of the present invention, execution of the second task requires an execution variable S, in the cooperation watching area of the second task, an address addr (S) of a parameter S in the memory is stored. S is also an execution result of the first task at the same time. If execution of the first task is not finished, the execution result S of the first task is unknown, S in the addr (S) is also not updated, and the second task is incapable of obtaining the execution variable of the second task. In this case, the second task naturally cannot be executed.

After execution of the first task is finished, the memory space snapshot of the first task and the memory space corresponding to the memory space snapshot of the first task may be updated. In this way, the parameter S stored in the memory address addr (S) is updated, so that the second task is enabled to obtain the execution variable S of the second task through the addr (S) stored in the cooperation watching area of the second task, and the second task is executed after S is updated.

An updating operation on the memory space snapshot has atomicity. That is to say, for updating of a memory snapshot, either all memory snapshots are updated or memory snapshots are not updated at all. When the memory space corresponding to the memory space snapshot of the first task is updated, two cases may occur.

First, if the memory space corresponding to the memory space snapshot of the first task is updated by a task other than the first task when the memory space corresponding to the memory space snapshot of the first task is updated, updating of the memory space snapshot and its corresponding memory space is aborted. Second, if the memory space corresponding to the memory space snapshot of the first task is not updated by a task other than the first task when the memory space corresponding to the memory space snapshot of the first task is updated, the memory space snapshot and its corresponding memory space are updated.

The foregoing cases occur because the memory space corresponding to the memory space snapshot of the first task is the shared memory space, and updating of content stored in the memory space may not only be performed by the first task, but also be performed by a task other than the first task and the second task. Therefore, if the memory space snapshot of the first task and its corresponding memory space need to be updated after execution of the first task is finished, first it should be determined whether the memory space corresponding to the memory space snapshot of the first task is updated by another task. There may be multiple specific determining methods, which are not limited in the present invention. For example, in an embodiment of the present invention, the determination may be performed through a method of determining whether a current memory status (such as version number information) of the memory space is the same as a memory status (such as a status of the memory space snapshot of the first task) of the memory space before the first task is executed.

In an embodiment of the present invention, if the memory space corresponding to the memory space snapshot of the first task is updated by the task other than the first task, the updating of the memory space snapshot of the first task and its corresponding memory space is aborted. In this case, preferably, the first task may be recreated, so that the first task may be re-executed, thereby implementing possible updating of the memory space snapshot of the first task. If the memory space corresponding to the memory space snapshot of the first task is not updated by the task other than the first task, the memory space snapshot and its corresponding memory space are updated.

Further, in another embodiment of the present invention, a cooperation parameter of the second task is not updated by the first task. That is to say, in this embodiment, the execution result of the first task does not generate any constraint on execution of another task (the second task in this embodiment), and another task may be executed without the need of obtaining the execution result of the first task. In this case, the memory space snapshot of the first task may be deleted after the memory space snapshot of the first task and the memory space corresponding to the memory space snapshot of the first task are updated. In this way, a cooperation problem between tasks is not involved, and therefore, a greater memory space may be released after the memory space snapshot is deleted in time.

It should be noted that, in the foregoing embodiment, after the execution of the first task is completed, the memory space snapshot of the first task and its corresponding memory space are updated. If the cooperation parameter of the second task is also stored in the memory space corresponding to the memory space snapshot of the first task, the cooperation parameter of the second task is also updated, and the second task is activated. However, the present invention is not limited, and the execution result of the first task may be associated with cooperation execution of more than one task.

Further, in another embodiment of the present invention, if in the distributed shared memory structure, multiple tasks that need to be cooperated exist, that is, multiple tasks having cooperation watching areas exist, a watcher queue may be set for scheduling of these tasks, and the second task is put into the watcher queue. The watcher queue is a queue storing a task that has a cooperation watching area but cannot be executed immediately.

In this case, the updating of the memory space corresponding to the memory space snapshot of the first task can enable the second task in the watcher queue to obtain, through the address of the execution variable in the cooperation watching area, that the execution variable of the second task is updated. Then, the second task is activated, and is moved from the watcher queue to an execution queue, waiting to be scheduled and executed. The execution queue is a queue storing a task to be executed immediately.

In this embodiment, after the execution of the first task is completed, and the memory space snapshot of the first task and its corresponding memory space are updated, through a method of searching a cooperation watching area of each task in the watcher queue, it may be obtained whether the cooperation parameter of the second task and a cooperation parameter of another task in the watcher queue are updated by the first task, and all tasks whose execution variables are updated by the first task, where all tasks are in the watcher queue and include the second task, are moved from the watcher queue to the execution queue. In this manner, it is ensured that all tasks that need to be cooperated with the execution result of the first task are cooperated through the method.

For example, in an embodiment of the present invention, a task B, a task C, and a task D are in a watcher queue, where execution of the task B and the task C relies on an execution result of a task A, that is, execution variables of the task B and the task C include the execution result of the task A, while execution of the task D does not rely on the execution result of the task A. After execution of the task A is completed, a memory space snapshot of the task A and its corresponding memory space are updated, and the updating enables the task B and the task C to obtain that their execution variables are updated, so that the task B and the task C are moved from the watcher queue to an execution queue, waiting to be executed. Because an execution variable of the task D is not updated, the task D still remains in the watcher queue.

After the second task is put into the watcher queue, in this embodiment, the allocating the second task to the second computing node, so that the second task is executed after the execution variable of the second task is updated may be: if in the execution variable of the second task, at least one memory space corresponding to the execution variable is not updated, the second task is put back into the watcher queue; and if all memory spaces corresponding to the execution variable of the second task are updated, the second task is executed.

For example, in an embodiment of the present invention, execution of the second task requires an execution result R1 of the first task and an execution result R3 of a third task, that is, the execution variable of the second task includes R1 and R3. After being created, the second task is put into a watcher queue first. If execution of the first task is completed first, and the memory space snapshot of the first task and its corresponding memory space are updated, correspondingly, R1 is updated, so that the second task may be enabled to obtain the updated execution variable R1 through the memory address of the execution variable in the cooperation watching area of the second task. The second task is activated, and moved from the watcher queue to an execution queue, waiting to be scheduled and executed. The second task is immediately executed after being scheduled out of the execution queue. In this case, if it is found that in the execution variable of the second task, the execution result R3 of the third task is not updated, execution of the second task is stopped, and the second task is put back into the watcher queue. After execution of the third task is completed, and the execution result R3 of the third task is updated to a memory space snapshot of the third task and its corresponding memory space, the second task may be enabled to obtain that the execution variable R3 of the second task is updated. The second task is reactivated and moved from the watcher queue to the execution queue, waiting to be executed. In this case, because the execution variables R1 and R3 of the second task are updated, when the second task is scheduled out of the execution queue, the second task may be executed immediately.

The method of the embodiment of the present invention may be executed by a universal integrated circuit, such as a CPU (Central Processing Unit) or an ASIC (Application Specific Integrated Circuit).

To help persons skilled in the art better understand the technical solutions of the present invention, the specific technical solutions of the embodiments of the present invention are described in detail through specific embodiments below. It may be understandable that, the specific embodiments below are merely intended to describe the present invention, but are not intended to limit the present invention.

Figure 2:
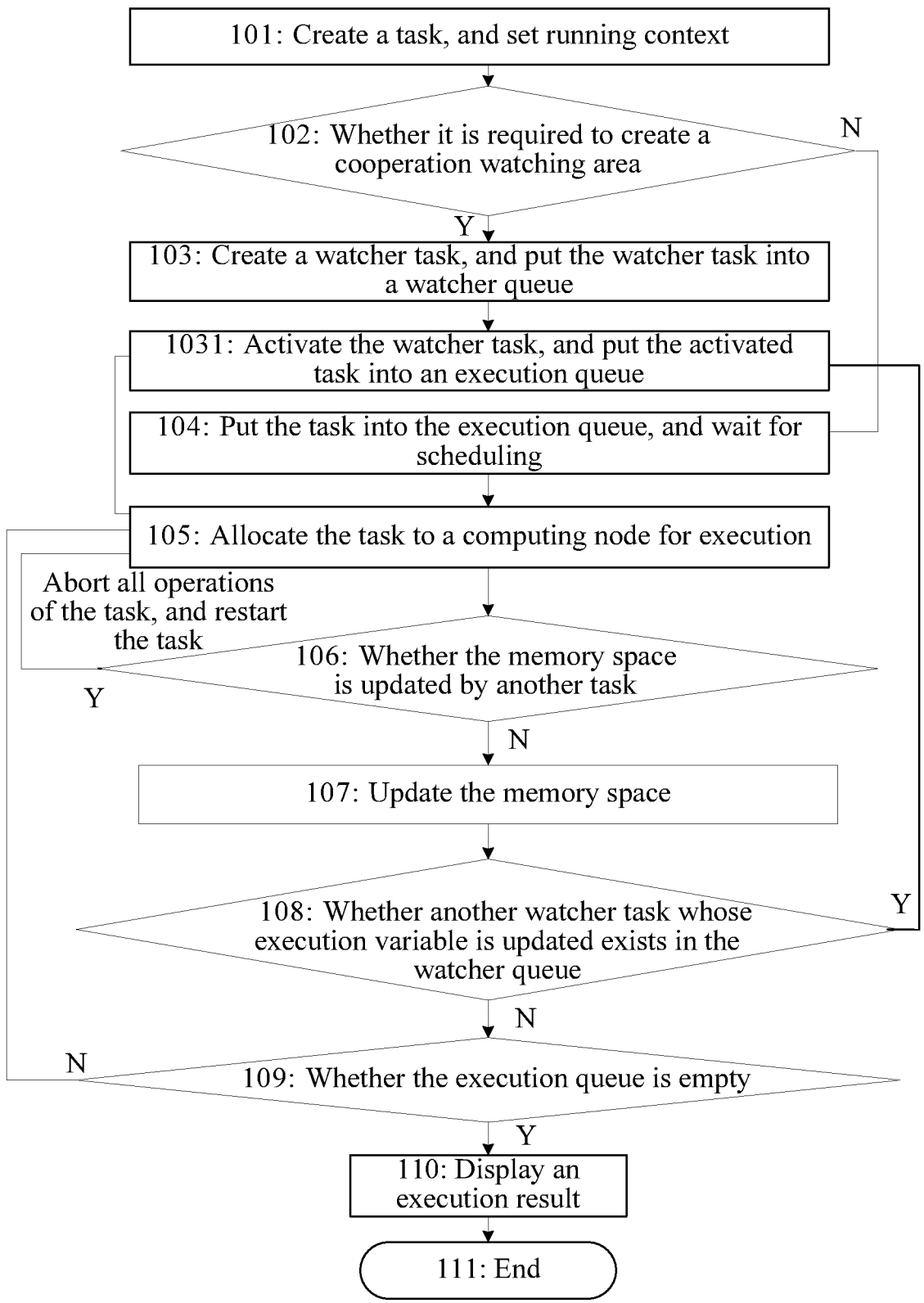
FIG. 2 is a detailed flow chart of a method for coordinating execution of tasks in a computing system having a distributed shared memory according to an embodiment of the present invention.

FIG. 2 is a method flow chart of a specific embodiment of a method for coordinating execution of tasks in a computing system having a distributed shared memory according to the present invention. As shown in FIG. 2, the method may include:

101: Create a task, and set execution context of the task.

102: Determine whether a cooperation watching area needs to be created, and if yes, execute step 103; if no, execute step 104.

It may be determined whether execution of the task needs to be cooperated with another task. If execution of the task needs to be cooperated with another task, the cooperation watching area needs to be created for the task, so as to obtain whether an execution variable of the task is updated; if execution of the task does not need to be cooperated with another task, the cooperation watching area does not need to be created for the task.

103: Create a watcher task, and put the watcher task into a watcher queue.

The watcher task is a task whose execution requires cooperation of an execution variable.

1031: Activate the watcher task to be a normal task (referred to as a task for short hereinafter), put the task into an execution queue; and execute step 105.

104: Put the task into the execution queue, and wait for scheduling.

105: Allocate the task to a computing node for execution.

106: After execution of the task is finished, determine whether a memory space of the task is updated by another task; if yes, abort all operations of the task this time, restart the task, and execute step 105; if no, execute step 107.

107: Update a memory space snapshot of the task and its corresponding memory space.

108: Determine whether a watcher task whose execution variable is updated exists in the watcher queue; if yes, execute step 1031; if no, execute step 109.

109: Determine whether the execution queue is empty; if yes, execute step 110; if no, jump to step 105.

110: Display an execution result.

111: End.

It should be noted that, in the task cooperation method for a distributed shared memory provided by the embodiment of the present invention, a task may be enabled to obtain whether an execution variable of the task is updated through a cooperation watching area of the task and the task is executed according to the updated execution variable. Memory consistency of a distributed shared memory system, namely, correctness of an operation performed by a program on a memory, is well maintained; meanwhile, frequent message sending and status detection required for cooperating tasks and maintaining memory consistency of the distributed shared memory are reduced greatly, which not only simplifies programming, but also improves processing performance of the system.

For another example, in the task cooperation method for a distributed shared memory provided by the embodiment of the present invention, a producer-consumer problem can be effectively handled. For simplicity, it is assumed that the number of full buffer units in a buffer area is n (an initial value is 0), producing one product by a producer corresponds to adding 1 to a value of n, and consuming one product by a consumer corresponds to subtracting 1 from a value of n. A variable m is used to control updating of n performed by the producer and the consumer: When m is 1, access from the consumer is permitted, and the producer waits; when m is 0, access from the producer is permitted, and the consumer waits.

It is assumed that an initial value of the variable m is 0, and a producer task and a watcher task of the producer are created at the same time, where specific pseudo codes are shown in Table 1:

TABLE 1

| producer_runner: | consumer_runner: |
|---|---|
| if (m == 1) | if (m == 0) |
|    exit and abort |    exit and abort |
| else | else |
|    n = n+1 |    n = n−1 |
|    m = 1 |    m = 0 |
|    exit and commit |    exit and commit |
| producer_watcher: | consumer_watcher: |
|    watches m and n |    watches m and n |
|    if (m == 1) then |    if (m == 0) then |
|       exit and abort |       exit and abort |
|    else |    else |
|       create producer_runner |       create consumer_runner |
|       create producer_watcher |       create consumer_watcher |
|       exit and commit |       exit and commit |

Further, producer_runner is a producer task, producer_watcher is a watcher task of the producer, consumer_runner is a consumer task, and consumer_watcher is a watcher task of the consumer. The producer_runner and the consumer_runner are normal tasks while the producer_watcher and the consumer_watcher are watcher tasks having cooperation watching areas, and cannot be directly put into an execution queue for execution after being created, but should be put into a watcher queue; after it is obtained, through memory addresses of execution variables in the cooperation watching areas of the producer_watcher and the consumer_watcher, that the execution variables are updated, the producer_watcher and the consumer_watcher are activated to be normal tasks, and moved from the watcher queue to the execution queue, waiting to be executed. Task cooperation is implemented in this manner. By adopting the foregoing task cooperation method, it is ensured that each producer and consumer are capable of updating n.

In this embodiment, if the producer_watcher is activated, activation of the producer_watcher may be triggered through updating of m and n by the producer_runner or the consumer_runner. In this case, the producer_watcher may determine, according to a value of m, whether an activation operation originates from the producer_runner or the consumer_runner.

When m is 1, it indicates that the producer_runner is committed successfully, that is, a memory space snapshot of the task and its corresponding memory space are updated by an execution result of the producer_runner. That is, updating of the producer_runner is applied to a global memory.

When m is 0, it indicates that the consumer_runner is committed successfully, that is, a memory space snapshot of the task and its corresponding memory space are updated by an execution result of the consumer_runner. When the execution result of the producer_runner is not committed or is being committed, it is found that the memory space corresponding to the memory space snapshot of the producer_runner is updated by the consumer_runner. Therefore, all operations of the producer_runner this time and modification to the memory space snapshot and its corresponding memory space are aborted. In this case, preferably, the producer_watcher may recreate producer_runner and producer_watcher, so as to ensure that the producer_runner can also be rescheduled and re-executed in a case that committing fails and all the operations of the task are aborted.

The method of the embodiment of the present invention may be executed by a universal integrated circuit, such as a CPU, or an ASIC.

Figure 3:
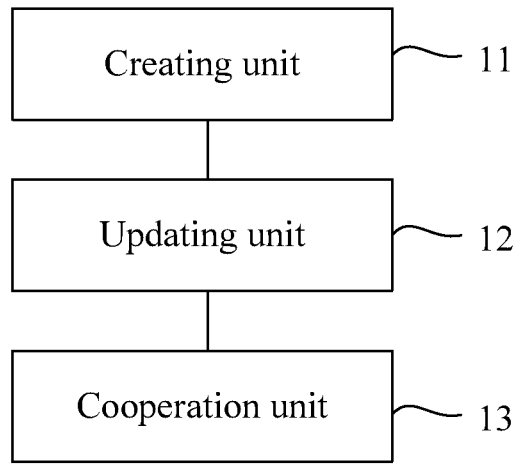
FIG. 3 is a schematic structural diagram of a task cooperation apparatus for coordinating execution of tasks in a computing system having a distributed shared memory according to an embodiment of the present invention.

Correspondingly, as shown in FIG. 3, the present invention further provides a task cooperation apparatus for a distributed shared memory, where the apparatus includes: a creating unit 11 configured to create a memory space snapshot of a first task and a cooperation watching area of a second task, where the cooperation watching area of the second task includes a memory address of an execution variable of the second task, and the execution variable is a parameter necessary for implementing cooperation of a task to be cooperated; an updating unit 12 configured to allocate the first task to a first computing node for execution, and update the memory space snapshot of the first task and a memory space corresponding to the memory space snapshot of the first task after execution of the first task is finished; and a cooperation unit 13 configured to: if the execution variable of the second task is updated by the first task, enable the second task to obtain the execution variable of the second task according to the memory address of the execution variable in the cooperation watching area of the second task, and allocate the second task to a second computing node, so that the second task is executed using the updated execution variable.

After the foregoing technical solution is adopted, in the task cooperation apparatus for a distributed shared memory provided by the embodiment of the present invention, the memory space snapshot of the first task and the cooperation watching area of the second task are created, where the cooperation watching area of the second task stores the memory address of the execution variable of the second task. In one aspect, the first task is locally executed at a computing node, and a shared memory space is not updated until the task is completed. In another aspect, if the execution variable of the second task is updated by the first task, the second task may be enabled to obtain the execution variable of the second task according to the memory address of the execution variable of the second task, and the second task is allocated to the second computing node, so that the second task is executed after the execution variable is updated by the first task. Memory consistency of a distributed shared memory system, namely, correctness of an operation performed by a program on a memory, is well maintained; meanwhile, frequent message sending and status detection required for cooperating tasks and maintaining memory consistency of the distributed shared memory are reduced greatly, which not only simplifies programming, but also improves processing performance of a system.

Figure 4:
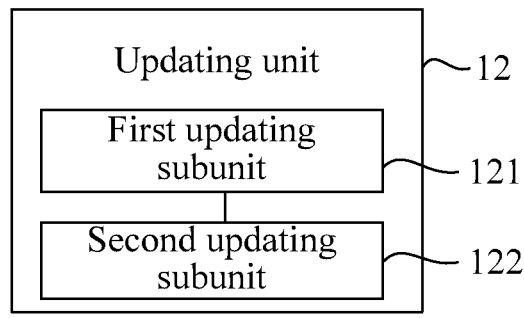
FIG. 4 is a schematic structural diagram of an updating unit in a task cooperation apparatus for coordinating execution of tasks in a computing system having a distributed shared memory according to an embodiment of the present invention.

As shown in FIG. 4, the updating unit 12 may include: a first updating subunit 121 configured to: when the memory space corresponding to the memory space snapshot of the first task is updated by a task other than the first task, abort updating of the memory space snapshot of the first task and its corresponding memory space; and a second updating subunit 122 configured to: when the memory space corresponding to the memory space snapshot of the first task is not updated by a task other than the first task, update the memory space snapshot of the first task and its corresponding memory space.

Figure 5:
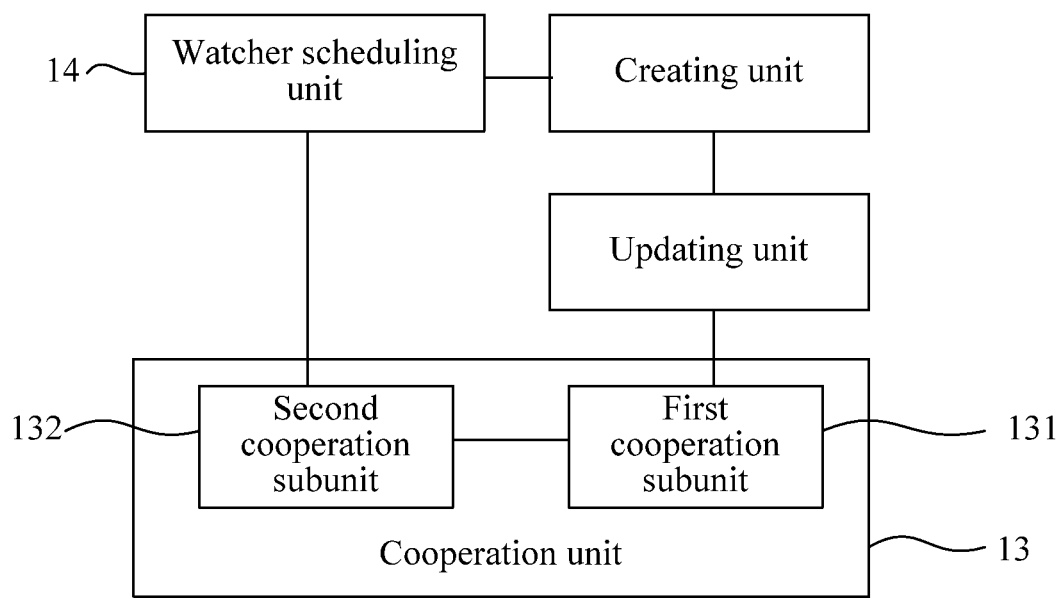
FIG. 5 is another schematic structural diagram of a task cooperation apparatus for coordinating execution of tasks in a computing system having a distributed shared memory according to an embodiment of the present invention.

Further, as shown in FIG. 5, in another embodiment of the present invention, the apparatus further includes a watcher scheduling unit 14 configured to put the second task into a watcher queue, where the watcher queue is a queue storing a task that has a cooperation watching area but cannot be executed immediately. The cooperation unit 13 may include: a first cooperation subunit 131 configured to: when the execution variable of the second task is updated by the first task, enable the second task to obtain the execution variable of the second task according to the memory address of the execution variable in the cooperation watching area of the second task; and a second cooperation subunit 132 configured to: after the second task is moved from the watcher queue to an execution queue, allocate the second task to the second computing node, where the execution queue is a queue storing a task to be executed immediately.

Optionally, the second cooperation subunit 132 may be configured to: after all tasks whose execution variables are updated by the first task, where all tasks are in the watcher queue and include the second task, are moved from the watcher queue to the execution queue, allocate the second task to the second computing node.

The second cooperation subunit 132 may be configured to: after the second task is moved from the watcher queue to the execution queue, if in the execution variable of the second task, at least one memory space corresponding to the execution variable is not updated, put the second task back into the watcher queue; and after the second task is moved from the watcher queue to the execution queue, if all memory spaces corresponding to the execution variable of the second task are updated, execute the second task.

The method in the embodiment of the present invention may be executed by a universal integrated circuit, such as a CPU, or an ASIC.

Correspondingly, the present invention further provides a distributed shared memory system, where the system includes a first computing node, a second computing node and any task cooperation apparatus for a distributed shared memory provided in the foregoing embodiments. The task cooperation apparatus for a distributed shared memory is located in the first computing node, or located in the second computing node, or connected to the first computing node and the second computing node, and is configured to cooperate tasks that need to be cooperated in the first computing node and the second computing node. Because the distributed shared memory system includes the task cooperation apparatus for a distributed shared memory in the foregoing embodiment, beneficial technical effects that can be implemented by the apparatus may also be implemented, and are described in detail in the foregoing and are not repeatedly described here.

The method in the embodiment of the present invention may be executed by a universal integrated circuit (such as a CPU), or an ASIC. The apparatuses, modules, and units in the embodiments of the present invention may be universal integrated circuits (such as CPUs), ASICs or other devices.

Through the foregoing description of implementation manners, persons skilled in the art may clearly understand that the present invention may be implemented by software plus necessary universal hardware, and definitely may also be implemented by hardware, but in many cases, the former is a preferred implementation manner. Based on such understanding, the essence of the technical solutions of the present invention or the part that makes contributions to the prior art may be embodied in a form of a software product. The computer software product is stored in a readable storage medium, for example, a floppy disk, a hard disk, or an optical disk of the computer, and includes several instructions used to enable a computer device (for example, a personal computer, a server, or a network device) to perform the methods according to the embodiments of the present invention.

Persons of ordinary skill in the art may be aware that various units and algorithm steps of the examples described in conjunction with the disclosed embodiments can be implemented by electronic hardware, or a combination of computer software and electronic hardware. Whether the functions are executed by hardware or software depends on particular applications and design constraint conditions of the technical solutions. Persons skilled in the art may use different methods to implement the described functions for every specific application, but it should not be considered that the implementation goes beyond the scope of the present invention.

Persons skilled in the art may clearly understand that, for convenience and simplicity of description, for detailed working processes of the foregoing system, apparatus and unit, reference may be made to corresponding processes in the foregoing method embodiments, and details are not repeatedly described herein.

In the several embodiments provided in the application, it should be understood that the disclosed system, apparatus, and method may be implemented in other manners. For example, the foregoing described apparatus embodiments are merely exemplary. For example, the dividing of the foregoing units is merely a kind of logical function dividing, and there may be other dividing manners in actual implementation. For example, multiple units or components may be combined or integrated into another system, or some features can be ignored or may not be executed. In addition, the shown or discussed mutual coupling or direct coupling or communication connection is implemented through some interfaces, and the indirect coupling or communication connection between the apparatuses or units may be electronic, mechanical or in other forms.

The units described as separate parts may or may not be physically separated, and parts shown as units may or may not be physical units, may be located in one position, or may also be distributed on multiple network units. Part or all of the units may be selected according to the actual needs to achieve the objectives of the solutions of the embodiments.

In addition, functional units in the embodiments of the present invention may be integrated into a processing unit, each of the units may also exist alone physically, and two or more than two units may also be integrated into a unit.

The foregoing descriptions are merely specific implementation manners of the present invention, but not intended to limit the protection scope of the present invention. Any variation or replacement that may be easily derived by those skilled in the art within the technical scopes disclosed in the present invention shall fall within the protection scope of the present invention. Therefore, the protection scope of the present invention shall be subject to the appended claims.

What is claimed is:

1. A method for coordinating execution of tasks in a computing system having a distributed shared memory, comprising:
    creating a snapshot of a memory space assigned to a first task, the memory space being a part of the distributed shared memory;
    creating a cooperation watching area of a second task, wherein the second task has an execution variable that is modified by the first task, and wherein the cooperation watching area contains a memory address pointing to a location where the execution variable of the second task is stored in the memory space assigned to the first task;
    allocating the first task to a first computing node of the computing system for execution;
    updating, according to an execution result of the first task, the snapshot of the memory space and data in the memory space; and
    allocating the second task to a second computing node of the computing system, including providing access to the memory address for the execution variable, for the second computing node to execute the second task using the execution variable after updating the memory space of the first task.

2. The method according to claim 1, wherein after creating the cooperation watching area of the second task, the method further comprises putting the second task into a watcher queue, and wherein the watcher queue is a queue storing a task that has a cooperation watching area but cannot be executed immediately.

3. The method according to claim 2, wherein the step of allocating the second task to the second computing node comprises moving the second task from the watcher queue to an execution queue, and wherein the execution queue is a queue storing a task to be executed immediately.

4. The method according to claim 3, wherein the step of moving the second task from the watcher queue to the execution queue comprises moving all tasks whose execution variables are updated by the first task from the watcher queue to the execution queue, and wherein all tasks are in the watcher queue and include the second task.

5. The method according to claim 1, wherein after the step of allocating the second task to the second computing node, the method further comprises:
    determining, by the second computing node, whether the plurality of execution variables of the second task have been updated when a plurality of execution variables are needed for implementing the second task;
    executing, by the second computing node, the second task based on a determination that the plurality of execution variables of the second task have been updated; and
    putting the second task back into the watcher queue based on a determination that at least one of the plurality of execution variables of the second task has not been updated.

6. The method according to claim 1, wherein the cooperation watching area of the second task is located in execution context of the second task.

7. A task cooperation apparatus for coordinating execution of tasks in a computing system having a distributed shared memory, comprising a processor configured to:
    create a snapshot of a memory space assigned to a first task, the memory space being a part of the distributed shared memory;
    create a cooperation watching area of a second task, wherein the second task has an execution variable that is modified by the first task, and wherein the cooperation watching area contains a memory address pointing to a location where the execution variable of the second task is stored in the memory space assigned to the first task;
    allocate the first task to a first computing node of the computing system for execution;
    update, according to an execution result of the first task, the snapshot of the memory space and data in the memory space; and
    allocate the second task to a second computing node of the computing system, including providing access to the memory address for the execution variable, for the second computing node to execute the second task using the execution variable after updating the memory space of the first task.

8. The apparatus according to claim 7, wherein the processor is further configured to put the second task into a watcher queue, and wherein the watcher queue is a queue storing a task that has a cooperation watching area but cannot be executed immediately.

9. The apparatus according to claim 8, wherein the operation of allocating the second task to the second computing node comprises move the second task from the watcher queue to an execution queue after the memory space of the first task is updated, and wherein the execution queue is a queue storing a task to be executed immediately.

10. The apparatus according to claim 9, wherein the processor is configured to move all tasks whose execution variables are updated by the first task from the watcher queue to the execution queue after updating the memory space of the first task, and wherein all tasks are in the watcher queue and comprise the second task.

11. The apparatus according to claim 7, wherein the cooperation watching area of the second task is located in execution context of the second task.

12. A computing system comprising:
a first computing node;
a second computing node;
a task cooperation apparatus; and
a distributed shared memory,
wherein the task cooperation apparatus is configured to:
create a snapshot of a memory space assigned to a first task, the memory space being a part of the distributed shared memory;
create a cooperation watching area of a second task, wherein the second task has an execution variable that is modified by the first task, and wherein the cooperation watching area contains a memory address pointing to a location where the execution variable of the second task is stored in the memory space assigned to the first task;
allocate the first task to a first computing node of the computing system for execution;
update, according to an execution result of the first task, the snapshot of the memory space and data in the memory space; and
allocate the second task to a second computing node of the computing system, including providing access to the memory address for the execution variable, for the second computing node to execute the second task using the execution variable after updating the memory space of the first task.

13. The computing system according to claim 12, wherein the task cooperation apparatus is further configured to put the second task into a watcher queue, and wherein the watcher queue is a queue storing a task that has a cooperation watching area but cannot be executed immediately.

14. The computing system according to claim 13, wherein the operation of allocating the second task to the second computing node by the task cooperation apparatus comprises moving the second task from the watcher queue to an execution queue after updating the memory space of the first task, and wherein the execution queue is a queue storing a task to be executed immediately.

15. The computing system according to claim 14, wherein the task cooperation apparatus is configured to move all tasks whose cooperation variables are updated by the first task from the watcher queue to the execution queue after the memory space of the first task is updated, and wherein the all tasks are in the watcher queue and comprise the second task.

16. The computing system according to claim 12, wherein a plurality of execution variables are used for implementing the second task, and wherein the second computing node is configured to:
determine whether the plurality of execution variables of the second task have been updated after the second task is allocated to the second computing node;
put the second task back into the watcher queue based on a determination that at least one of the plurality of execution variables of the second task has not been updated; and
execute the second task based on a determination that all memory spaces corresponding to the plurality of execution variables of the second task have been updated.

17. The computing system according to claim 12, wherein the task cooperation apparatus is located in the first computing node.

18. The computing system according to claim 12, wherein the task cooperation apparatus is located in the second computing node.

19. The computing system according to claim 12, wherein the task cooperation apparatus is connected to the first computing node and the second computing node.

20. The computing system according to claim 12, wherein the cooperation watching area of the second task is located in execution context of the second task.

* * * * *

UNITED STATES PATENT AND TRADEMARK OFFICE
CERTIFICATE OF CORRECTION

| | | |
|---|---|---|
| PATENT NO. | : 9,201,691 B2 | Page 1 of 1 |
| APPLICATION NO. | : 14/471198 | |
| DATED | : December 1, 2015 | |
| INVENTOR(S) | : Lin Gu, Zhiqiang Ma and Yulong Zeng | |

It is certified that error appears in the above-identified patent and that said Letters Patent is hereby corrected as shown below:

On the title page

Item 30 Foreign Application Priority Data should read:

Feb. 28, 2012 (CN) .............................. 201210004777.4

Signed and Sealed this
Nineteenth Day of April, 2016

Michelle K. Lee
*Director of the United States Patent and Trademark Office*